(12) United States Patent
Sha et al.

(10) Patent No.: US 12,536,812 B2
(45) Date of Patent: Jan. 27, 2026

(54) CAMERA PERCEPTION TECHNIQUES TO DETECT LIGHT SIGNALS OF AN OBJECT FOR DRIVING OPERATION

(71) Applicant: TuSimple, Inc., San Diego, CA (US)

(72) Inventors: Long Sha, San Diego, CA (US); Lezhou Feng, San Diego, CA (US); Pengfei Chen, San Diego, CA (US); Panqu Wang, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 7 days.

(21) Appl. No.: 18/599,015

(22) Filed: Mar. 7, 2024

(65) Prior Publication Data

US 2024/0320988 A1 Sep. 26, 2024

Related U.S. Application Data

(60) Provisional application No. 63/492,140, filed on Mar. 24, 2023.

(51) Int. Cl.
*G06V 20/58* (2022.01)
*G06T 7/90* (2017.01)
(Continued)

(52) U.S. Cl.
CPC .............. *G06V 20/584* (2022.01); *G06T 7/90* (2017.01); *G06V 10/25* (2022.01); *G06V 10/44* (2022.01);
(Continued)

(58) Field of Classification Search
CPC ........ G06V 10/25; G06V 10/44; G06V 10/60; G06V 10/806; G06V 20/584; G06V 2201/07; G06T 7/90; G06T 2207/20132
See application file for complete search history.

(56) References Cited

U.S. PATENT DOCUMENTS 7,365,769 B1   4/2008   Mager
11,093,789 B2   8/2021   Wang et al.
(Continued)

FOREIGN PATENT DOCUMENTS

KR   20170006443 A   *   1/2017   ............... B60R 1/00
WO   2022099313 A1       5/2022

OTHER PUBLICATIONS

Jonschkowski, Rico, et al. "What matters in unsupervised optical flow." Computer Vision—ECCV 2020: 16th European Conference, Glasgow, UK, Aug. 23-28, 2020, Proceedings, Part II 16. Springer International Publishing, 2020.
(Continued)

*Primary Examiner* — Peet Dhillon
(74) *Attorney, Agent, or Firm* — Perkins Coie LLP

(57) ABSTRACT

Techniques are described for performing image processing on images of cameras located on or in a vehicle. An example technique includes receiving a first set of images obtained by a first camera and a second set of images obtained by a second camera; determining, for each image in the first set, a first set of features of a first object; determining, for each image in the second set, a second set of features of a second object; obtaining a third set of features of an object by combining the first set of features and the second set of features; obtaining a fourth set of features of the object by including one or more features of a light signal of the object; determining characteristic(s) indicated by the light signal; and causing a vehicle to perform a driving related operation based on the characteristic(s) of the object.

19 Claims, 3 Drawing Sheets

(51) Int. Cl.
*G06V 10/25* (2022.01)
*G06V 10/44* (2022.01)
*G06V 10/60* (2022.01)
*G06V 10/80* (2022.01)

(52) U.S. Cl.
CPC .......... *G06V 10/60* (2022.01); *G06V 10/806* (2022.01); *G06T 2207/20132* (2013.01); *G06V 2201/07* (2022.01)

(56) References Cited

U.S. PATENT DOCUMENTS

| | | | |
|---|---|---|---|
| 2019/0087672 A1 | 3/2019 | Wang et al. | |
| 2019/0329769 A1 | 10/2019 | Shalev-Shwartz et al. | |
| 2019/0370574 A1 | 12/2019 | Wang et al. | |
| 2020/0070848 A1* | 3/2020 | Ozer | B60W 30/10 |
| 2020/0117915 A1* | 4/2020 | Ogale | G05D 1/0088 |
| 2020/0184233 A1* | 6/2020 | Berberian | G06V 20/588 |
| 2020/0310013 A1* | 10/2020 | Gruver | G05D 1/0246 |
| 2020/0393845 A1 | 12/2020 | Wang et al. | |
| 2021/0271906 A1* | 9/2021 | Creusot | G06V 20/584 |
| 2021/0374421 A1 | 12/2021 | Chakraborty et al. | |
| 2022/0147776 A1 | 5/2022 | Yang | |
| 2023/0306750 A1* | 9/2023 | Zhao | G06V 10/806 |

OTHER PUBLICATIONS

He, Fei, et al. "Temporal context enhanced feature aggregation for video object detection." Proceedings of the AAAI Conference on Artificial Intelligence. vol. 34. No. 07. 2020.

Luo, Kunming, et al. "ASFlow: Unsupervised Optical Flow Learning with Adaptive Pyramid Sampling." arXiv preprint arXiv:2104.03560 (2021).

Luo, Kunming, et al. "Upflow: Upsampling pyramid for unsupervised optical flow learning." Proceedings of the IEEE/CVF Conference on Computer Vision and Pattern Recognition. 2021.

Teed, Zachary, and Jia Deng. "Raft: Recurrent all-pairs field transforms for optical flow." European conference on computer vision. Springer, Cham, 2020.

Meister, Simon, Junhwa Hur, and Stefan Roth. "Unflow: Unsupervised learning of optical flow with a bidirectional census loss." Thirty-Second AAAI Conference on Artificial Intelligence. 2018.

Luo, Kunming, et al. "Occinpflow: Occlusion-inpainting optical flow estimation by unsupervised learning." arXiv preprint arXiv:2006.16637 (2020).

Liu, Pengpeng, et al. "Ddflow: Learning optical flow with unlabeled data distillation." Proceedings of the AAAI Conference on Artificial Intelligence. vol. 33. No. 01. 2019.

Wang, Yang, et al. "Occlusion aware unsupervised learning of optical flow." Proceedings of the IEEE Conference on Computer Vision and Pattern Recognition. 2018.

Liu, Liang, et al. "Learning by analogy: Reliable supervision from transformations for unsupervised optical flow estimation." Proceedings of the IEEE/CVF Conference on Computer Vision and Pattern Recognition. 2020.

European Patent Office, Extended European Search Report for EP Appl. No. 24165240.3 mailed on Jun. 21, 2024, 10 pages.

* cited by examiner

CAMERA PERCEPTION TECHNIQUES TO DETECT LIGHT SIGNALS OF AN OBJECT FOR DRIVING OPERATION

CROSS-REFERENCE TO RELATED APPLICATIONS

This document claims priority to and the benefit of U.S. Provisional Patent Application No. 63/492,140, filed on Mar. 24, 2023. The aforementioned application of which is incorporated herein by reference in its entirety.

TECHNICAL FIELD

This document relates to systems, apparatus, and methods to perform image processing techniques on images or image frames provided by cameras on or in a vehicle to detect light signals of one or more objects (e.g., a vehicle) for driving operation.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

This patent document describes systems, apparatus, and methods to perform image processing techniques on images obtained from multiple cameras on or in a vehicle to detect and/or to determine light signal related characteristics of one or more object (e.g., one or more vehicles) located in the images.

An example method of driving operation includes receiving, by a computer located in a vehicle, a first set of images obtained by a first camera over time and a second set of images obtained by a second camera over time, where the first camera and the second camera are located on or in the vehicle; determining, for each image in the first set of images, a first set of features of a first object; determining, for each image in the second set of images, a second set of features of a second object; obtaining, in response to determining that the first object is same as the second object, a third set of features of an object as a function of time by combining the first set of features of the first object for the first set of images and the second set of features of the second object for the second set of images; obtaining a fourth set of features of the object by including one or more features of a light signal of the object determined from the third set of features of the object; determining one or more characteristics indicated by the light signal of the object from the fourth set of features of the object; and causing the vehicle to perform a driving related operation on a road based on the one or more characteristics of the object.

In some embodiments, the determining the first set of features and the second set of features includes performing the following operations for each image from the first set of images and the second set of images: cropping a region comprising one object from an image, wherein the one object includes the first object or the second object; obtaining an adjusted region comprising the one object by adjusting the region to have a pre-determined width and a pre-determined height; obtaining, for the one object, a first array comprising values associated with a plurality of variables that includes: an order of the image within a time-dependent series of images that include the first set of images or the second set of images, a camera that obtained the image, and information associated with the adjusted region; obtaining a second array that includes a set of features for the one object by analyzing information associated with the adjusted region from the first array, wherein the set of features included of the one object includes the first set of features of the first object or the second set of features of the second object.

In some embodiments, the cropping the region includes adding a bounding box around the one object detected from the image and cropping the region comprising the bounding box around the one object. In some embodiments, the information associated with adjusted region includes: a width of the adjusted region, a height of the adjusted region, and a color component of the image. In some embodiments, the second array includes: the order of the image within the time-dependent series of images that include the first set of images or the second set of images, the camera that obtained the image, and the set of features for the one object. In some embodiments, the third set of features of the object is obtained by combining the second array of the one object for each image from the first set of images and the second set of images. In some embodiments, the combining the second array of the one object for each image from the first set of images and the second set of images is performed based on the order of the image within the time-dependent series of images.

In some embodiments, the third set of features includes: the order of the image within the time-dependent series of images that include the first set of images or the second set of images, and the set of features for the one object. In some embodiments, the one or more features of the light signal of the object includes information that indicates whether the light signal is on or off. In some embodiments, each of the first set of images and the second set of images comprises a pre-determined number of images. In some embodiments, the determine the first set of features is performed in response to a first determination that the first set of images comprises the pre-determined number of images, and the determine the second set of features is performed in response to a second determination that the second set of images comprises the pre-determined number of images. In some embodiments, the first set of features or the second set of features includes a type of the first object or the second object, whether a light signal of the first object or of the second object is indicated, or a color of the light signal of the first object or of the second object. In some embodiments, each image in the first set of images and the second set of images is associated with a time stamp.

In some embodiments, the causing the vehicle to perform the driving related operation on a road in response to the determining the one or more characteristics of the object includes: sending instructions a brake system of the vehicle to cause the brake system to apply brakes in response to determining that the object has applied brakes and in response to determining that a distance between the object and the vehicle is less than a pre-determined distance. In some embodiments, the determining the one or more characteristics indicated by the light signal of the object from the fourth set of features of the object includes: determining that brakes are being applied by the object in response to determining, using the fourth set of features of the object, that the light signal of the object has been on for more than a pre-determined length of time. In some embodiments, the determining the one or more characteristics indicated by the light signal of the object from the fourth set of features of the object includes: determining that the object is intending to change lanes from a current lane to another lane on the road in response to determining, using the fourth set of features of the object, that the light signal on the object is periodically switching on and off.

In some embodiments, the determining the one or more characteristics indicated by the light signal of the object from the fourth set of features of the object includes: determining that the object is an emergency vehicle in response to determining, using the fourth set of features of the object, that a pattern of switching on and off for the light signal of the object is related to the emergency vehicle. In some embodiments, the determining the one or more characteristics indicated by the light signal of the object from the fourth set of features of the object includes: determining that the object is indicating an emergency signal upon determining, using the fourth set of features of the object, that a pattern of switching on and off of the light signal of the object indicates the emergency signal.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

An autonomous driving operation of a vehicle can be based on a detection or recognition of a light signal from an object (e.g., another vehicle) driving in front of or around the first vehicle. When multiple cameras provide a series of images or image frames to computer(s) located in a vehicle, the computer can perform image processing techniques to analyze images provided by the multiple cameras to detect or recognize a light signal from an object located around the vehicle. Thus, techniques described in this patent document can effectively and/or efficiently detect or recognize light signal from an object using multiple cameras on or in the vehicle.

Section I provides an overview of the devices/systems located on or in a vehicle, such as an autonomous semi-trailer truck. The devices/systems can be used to perform the image processing techniques that are described in Section II of this patent document, where the example image processing techniques can effectively and/or efficiently analyze multiple images or image frames from multiple cameras.

I. Vehicle Driving Ecosystem

Figure 1:
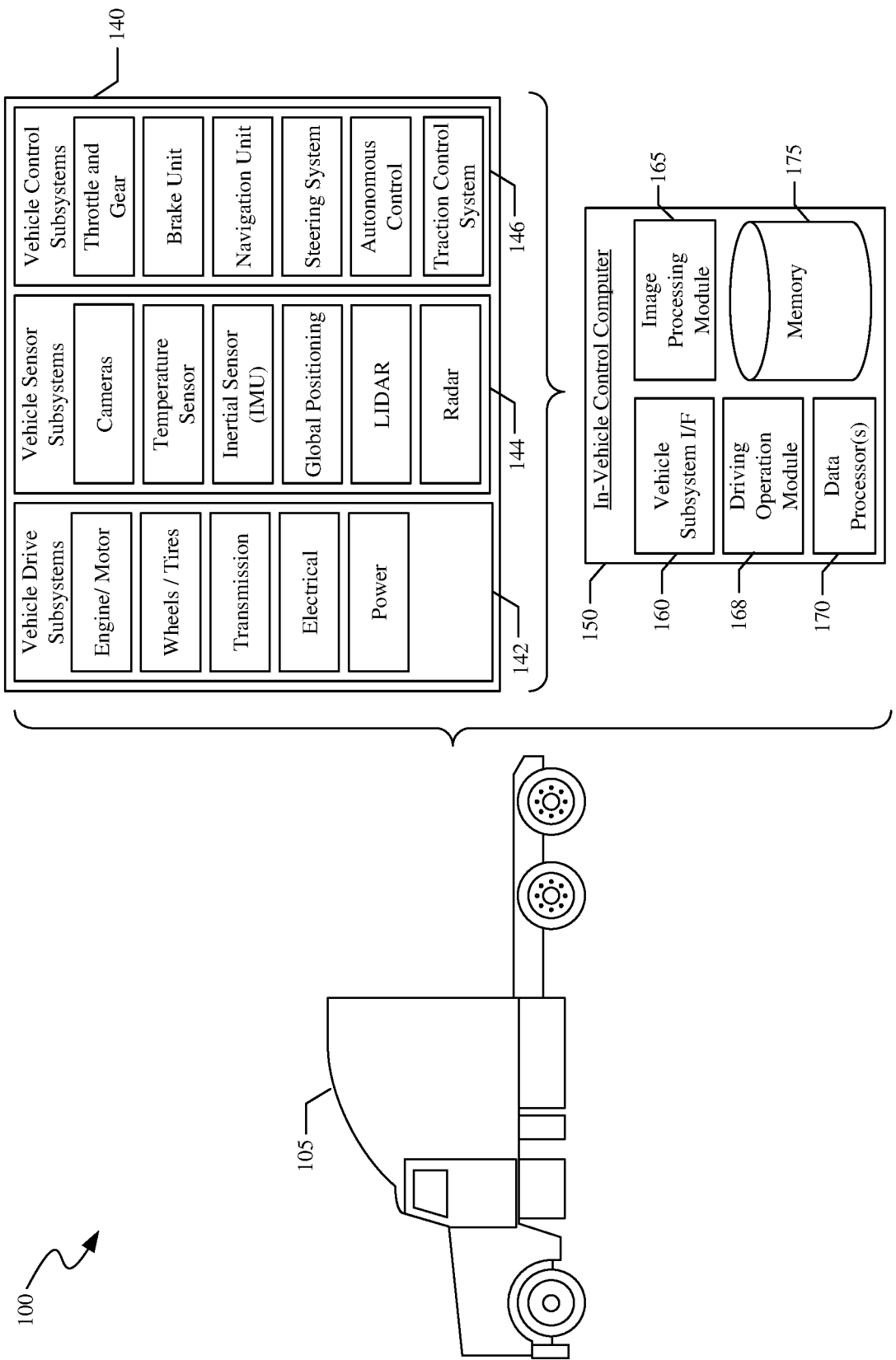
FIG. 1 shows a block diagram of an example vehicle ecosystem in which driving operations can be determined based on the image processing performed on images obtained from cameras on or in a vehicle.

FIG. 1 shows a block diagram of an example vehicle ecosystem 100 in which driving operations can be determined based on the image processing performed on images obtained from cameras on or in a vehicle 105. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in a vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices (e.g., LiDAR or Radar shown in FIG. 1) can be removed. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the vehicle 105. The sensors associated with the vehicle sensor subsystem 144 may be located on or in the vehicle 105. The vehicle sensor subsystem 144 may include a plurality of cameras or image capture devices, one or more temperature sensors, an inertial measurement unit (IMU), a Global Positioning System (GPS) transceiver, a laser range finder/LIDAR unit, a RADAR unit, and/or a wireless communication unit (e.g., a cellular communication transceiver). The vehicle sensor subsystem 144 may also include sensors configured to monitor internal systems of the vehicle 105 (e.g., an $O_2$ monitor, a fuel gauge, an engine oil temperature, etc.).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The plurality of cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the vehicle 105. The gear may be configured to control the gear selection of the transmission. The brake unit can include any combination of mechanisms configured to decelerate the vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. The steering system may represent any combination of mechanisms that may be operable to adjust the heading of vehicle 105 in an autonomous mode or in a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LIDAR, the cameras, and/or other vehicle subsystems to determine the driving path or trajectory for the vehicle 105.

The traction control system (TCS) may represent a control system configured to prevent the vehicle 105 from swerving or losing control while on the road. For example, TCS may obtain signals from the IMU and the engine torque value to determine whether it should intervene and send instruction to one or more brakes on the vehicle 105 to mitigate the vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the vehicle 105 in a distributed fashion. In some embodiments, the memory 175 may contain processing instructions (e.g., program logic) executable by the data processor 170 to perform various methods and/or functions of the vehicle 105, including those described for the image processing module 165 and the driving operation module 168 as explained in this patent document. For instance, the data processor 170 executes the operations associated with image processing module 165 for analyzing and/or processing the multiple images obtained from the cameras as described in this patent document. And, the data processor 170 executes the operations associated with driving operation module 168 for determining and/or performing driving related operations of the vehicle 105 based on the information provided by the image processing module 165.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a memory 175. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

II. Example Image Processing Techniques

Figure 2:
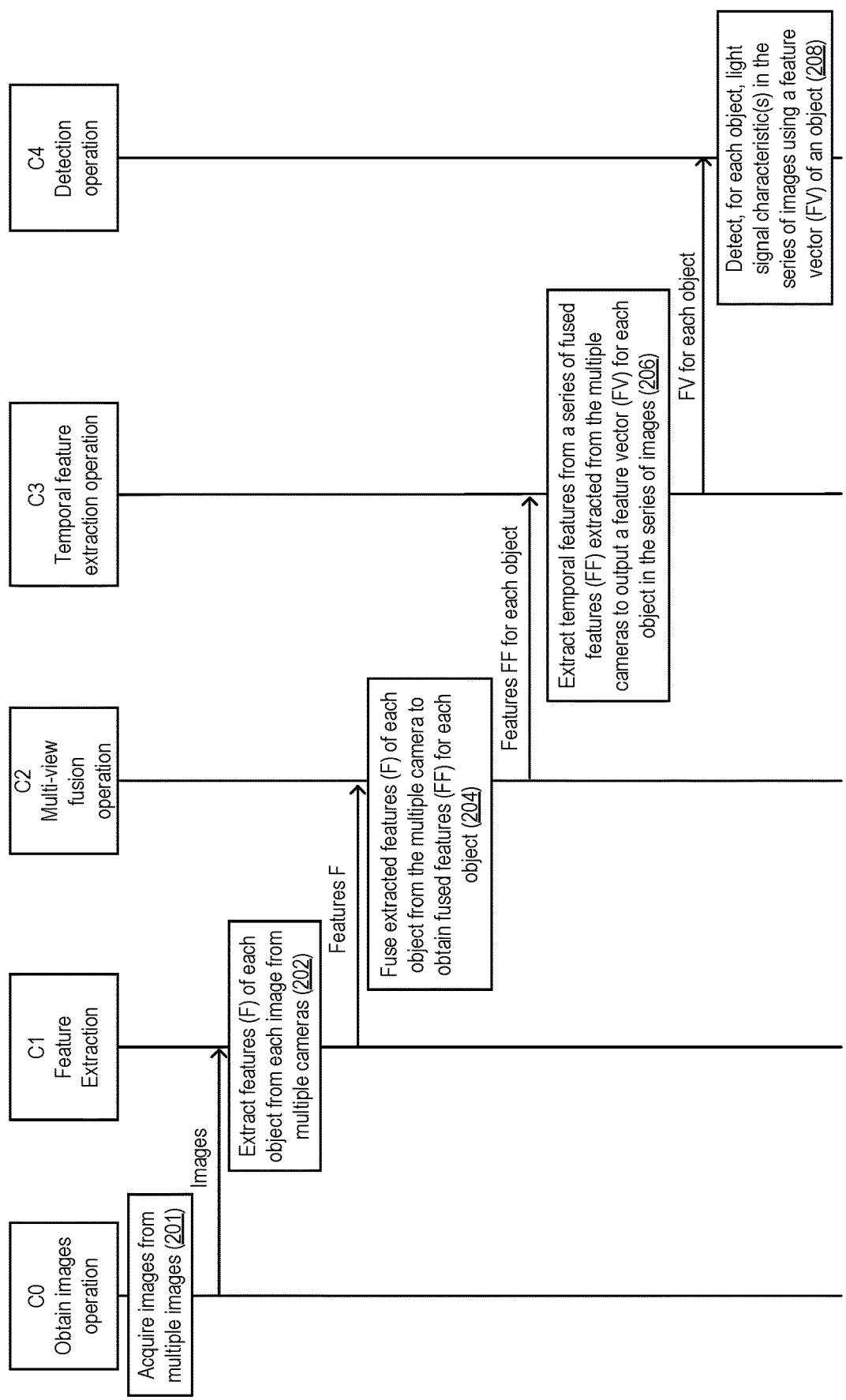
FIG. 2 shows an example flowchart of image processing operations using multiple images or image frames obtained from multiple cameras on or in a vehicle.

FIG. 2 shows an example flowchart of image processing operations using multiple images or image frames obtained from multiple cameras on or in a vehicle. The top of FIG. 2 generally describes operations associated with C1-C4 can be performed by the image processing module (165 in FIG. 1) in some embodiments. In some other embodiments, the operation of each of C1-C4 can be performed by a corresponding image processing module in one or more computers located in the vehicle.

At C0, the image processing module obtains images from a plurality of cameras located on or in a vehicle. At C0, the image processing module can determine that an object in the image of one camera is the same as the object in the another image of another camera. For example, the image processing module can determine that two objects in two images from two cameras are the same by determining that a location information associated with the two objects is the same or within a pre-determined distance of each other, and/or by determining that visual characteristics of the two objects are the same. In some embodiments, the image processing module can send information about the objects (e.g., information that the two objects in two images are the same) to the feature extraction operation at C1

At C1, the image processing module performs a feature extraction operation that can use a deep neural network to extract one or more features (F) related to each of one or more objects (e.g., one or more vehicles) detected from images obtained from the plurality of cameras. The one or more features of each object may include one or more visual characteristics of the object such as a type of object (e.g., color, shape, type of vehicle), whether a light is indicated by the object (e.g., taillight on or roof light on), color of the light, etc.

At C2, the image processing module performs a multi-view fusion operation that can use a neural network (e.g., a transformer-type neural network) to fuse the one or more extracted features (F) of each object from different cameras to obtain a set of one or more features (FF) for each object. Since each image obtained from each camera may be associated with a time stamp, the image processing module can use the time stamp information of an image to fuse one or more features of an object from one image obtained at a first time by a first camera with one or more features of the same object from another image obtained at the first time by a second camera.

At C3, the image processing module performs a temporal feature extraction operation that can be performed using a neural network to extract temporal features from a time series of one or more features (FF) extracted from the multiple cameras. The image processing module can output a feature vector (FV) which can include, for each object, a set of features of an object from the time series of images from the multiple cameras.

At C4, the image processing module can perform a detection operation where one or more characteristics related to a light signal from an object can be detected from the feature vector (FV) of that object. For example, using the FV (or a set of features) of an object from the time series of images, the image processing module can determine any one or more of at least the following: an indication of brakes being applied by an object upon determining by the image processing module that a light on the object has been on for more than a pre-determined length of time, an indication of an object intending to change lanes from a current lane to another lane on the road upon determining by image processing module that a light on the object is periodically switching on and off, an indication that the object is an emergency vehicle in response to determining by the image processing module that a pattern of switching on and off for the lights on the object is related to the emergency vehicle, or an indication that the object is indicating an emergency signal upon determining by the image processing module that a pattern of switching on and off for the lights on the object indicates the emergency signal, etc.

At operation 201, the image processing module may receive images from each of a plurality of cameras on or in a vehicle. At operation 202, the image processing module may detect whether an object is present in an image for each image, and may perform a feature extraction operation on the detected object as explained for C1 and as further explained below.

At operation 202, the image processing module can add a bounding box around the detected object, where the bounding box surrounds the object and identifies the detected object. The image processing module crops the object using the bounding box around the object from each image in the last T image frames (including the current image frame) from the plurality of cameras, where T is an integer greater than one and can be a pre-determined value. The image processing module can resize the cropped object so that all of the cropped objects have a same pre-determined pixel width and a same pre-determined pixel height (W×H). Thus, operation 202 can be performed for each of the T image frames so that the image processing module can obtain a five-dimensional (5D) array for each object, where the 5D array may be described as T×N×W×H×C, where T indicates an order of the image frame number within a time-dependent series of images (e.g., if a value for T is 2 and maximum value for T is 5, then T=2 indicates a second image in the series of five images), N is a number associated with a camera (e.g., a first camera can have N=1, the second camera can have N=2, and so on), W and H are respectively the pre-determined pixel width and the pre-determined pixel height of the cropped object, and C is the color component (e.g., can have value 1, 2, or 3 corresponding to red, green or blue (RGB) images). In some embodiments, N can be less than a maximum number of cameras located on or in the vehicle at least because a same object may not be detected by all of the cameras on or in the vehicle. Thus, having N be less than the maximum number of cameras can minimize waste of computational resources.

At operation 202, the image processing module can extract, for each object in the T images and for each camera, a set of one or more features (F) that characterize an object by analyzing the information indicated by W×H×C in the 5D array associated for an object. Thus, at operation 202, the image processing module can extract, for each object in the T images and for each camera, a set of one or more features (F) that characterize an object so that the set of one or more features (F) can have a three-dimensional (3D) array that may be described as T×N×D1, where D1 is an integer that describes a size of (or a number of features) in the set of features (F).

In some embodiments when a vehicle is initially started or when image processing is initially performed, the image processing module can repeatedly perform operation 202 until the pre-determined number of T image frames are obtained and processed by the image processing modules before the image processing module performs operation 204.

At operation 204, the image processing module can fuse or combine the set of features (F) for a same object for each of the plurality of objects and output fused features (FF) for each object, where FF can be associated with a two-dimensional (2D) array T×D1. For example, in a scenario where a vehicle includes at least two cameras and the two cameras obtain images that indicate a presence of an object around a vehicle comprising the cameras, operation 202 may be performed to obtain the 3D array for each of the at least two cameras so that the output from operation 202 can be T×2×D1 for the detected object. In this example, the image processing module can perform operation 204 by combining two one-dimensional (1D) arrays listed in second dimension for each time stamp and then removing the second dimension to output a 2D FF for the object upon determining that a first object from a first image of the first camera is the same as a second object from a second image of the second camera. The image processing module can also perform operation 204 by combining the two 3D arrays based on an order indicated by the variable T in the 3D array. For instance, at T=1, the image processing module can combine D1 of an object determined from a one image of a first camera with another D1 of the same object determined from another image from a second camera, where the another image is obtained at same time as the one image associated with T=1, and so on with T=2, T=3, etc.

In some embodiments, the image processing module can combine or fuse the two 3D arrays by performing a weighted sum operation. In such embodiments, the image processing module can assign a score that indicates a quality of a camera's viewpoint of the object. Using the example mentioned above, if image processing module determines that the object is partially captured by the images obtained by the first camera and if the image processing module determines that the object is wholly captured by the images obtained by the second camera, then the 2D FF (T×D1) of the object may include D1 from only the second 3D array (e.g., T×2×D1), or may include D1 from the second 3D array and/or some of the D1 from the first 3D array (e.g., T×1×D1). In some embodiments, the image processing module can obtain 2D FF based on a weighted value associated with each image obtained from the two cameras.

At operation 206, the image processing module can extract one or more temporal features by combining the FF of each object that is the same and outputs one feature vector (FV) for each object for the set of T images. At operation 206, the image processing module can combine the FF of an object of a current image frame (e.g., T×D1 where T=1) with FF of the object from each of the other T images (e.g., T=2 to T=5 if a maximum value of T is 5) to obtain FV for the object. For each object, the FV can have a size of D2, which indicates a number of temporal features in FV for an object. FV for an object can include one or more temporal features of an object (e.g., whether a light is turned on or off or flashing during the sequence) detected by the image processing module.

At operation 208, the image processing module can perform a detection operation using FV of each object, where the detection operation includes detecting or identifying one or more light signal characteristics indicated by a light signal of an object in the series of T images. The one or more characteristics of the light signal of the object detected using FV of an object may include an indication of brakes being applied by the object upon determining by the image processing module that a light on the object has been on for more than a pre-determined length of time. The length of time when a light is been on can be determined using the FV of the object. In another example, the one or more characteristics of the light signal of the object detected using FV of an object may include an indication of an object intending to change lanes from a current lane to another lane on the road upon determining by image processing module that a light on the object is periodically switching on and off using the FV of the object. In yet another example, the one or more characteristics of the light signal of the object detected using FV of an object may include an indication that the object is an emergency vehicle in response to determining by the image processing module that a pattern of switching on and off for the lights on the object using the FV of the object is related to the emergency vehicle. In another example, the one or more characteristics of the light signal of the object detected using FV of an object may include an indication that the object is indicating an emergency signal upon determining by the image processing module, and using the FV of the object, that a pattern of switching on and off for the lights on the object indicates the emergency signal.

In some embodiments, the driving operation module (shown as 168 in FIG. 1) can perform driving related operations in the vehicle using the one or more light signal characteristics of an object provided by the image processing operation after performing operation 208. For example, the driving operation module can send instructions to a motor in the steering system and to the brake system to steer the vehicle to a side of the road and to apply brakes to stop at the side of the road in response to the one or more characteristics indicating that the object is an emergency vehicle with the lights having a flashing (or strobing) pattern. In another example, the driving operation module can send instructions to a motor in the brake system to cause the brake system to apply brakes in response to determining that an object has applied brakes (or in response to determining that the object has applied brakes for more than a pre-determined length of time) and in response to determining that a distance between the object and the vehicle that includes the cameras and the in-vehicle control computer is less than a pre-determined distance.

There are several technical benefits of the image processing techniques described in this patent document. By separating the feature extraction operation in C1 from the temporal feature extraction operation in C3, the image processing technique can efficiently use the feature from each time step. Furthermore, by combining the information of an object from the current image frame with information of the object from previous image frames, the image processing module can reduce computational costs when performing operations of C3 and/or C4.

Figure 3:
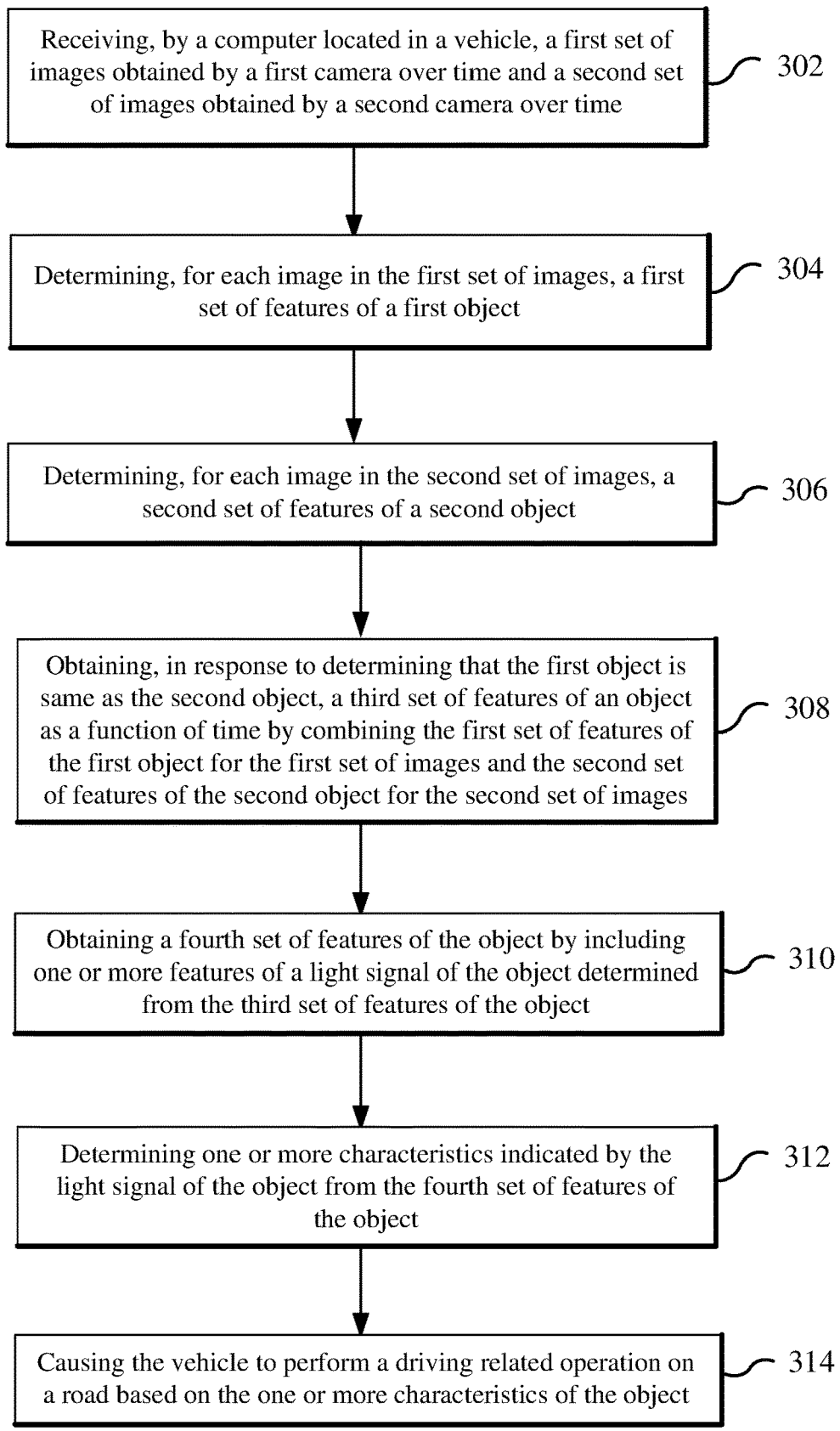
FIG. 3 shows an example flowchart for performing driving operation in a vehicle.

FIG. 3 shows an example flowchart for performing driving operation in a vehicle. Operation 302 includes receiving, by a computer located in a vehicle, a first set of images obtained by a first camera over time and a second set of images obtained by a second camera over time, where the first camera and the second camera are located on or in the vehicle. Operation 304 includes determining, for each image in the first set of images, a first set of features of a first object. Operation 306 includes determining, for each image in the second set of images, a second set of features of a second object. Operation 308 includes obtaining, in response to determining that the first object is same as the second object, a third set of features of an object as a function of time by combining the first set of features of the first object for the first set of images and the second set of features of the second object for the second set of images. Operation 310 includes obtaining a fourth set of features of the object by including one or more features of a light signal of the object determined from the third set of features of the object. Operation 312 includes determining one or more characteristics indicated by the light signal of the object from the fourth set of features of the object. Operation 314 includes causing the vehicle to perform a driving related operation on a road based on the one or more characteristics of the object.

In some embodiments, the determining the first set of features and the second set of features includes performing the following operations for each image from the first set of images and the second set of images: cropping a region comprising one object from an image, wherein the one object includes the first object or the second object; obtaining an adjusted region comprising the one object by adjusting the region to have a pre-determined width and a pre-determined height; obtaining, for the one object, a first array comprising values associated with a plurality of variables that includes: an order of the image within a time-dependent series of images that include the first set of images or the second set of images, a camera that obtained the image, and information associated with the adjusted region; obtaining a second array that includes a set of features for the one object by analyzing information associated with the adjusted region from the first array, wherein the set of features included of the one object includes the first set of features of the first object or the second set of features of the second object.

In some embodiments, the cropping the region includes adding a bounding box around the one object detected from the image and cropping the region comprising the bounding box around the one object. In some embodiments, the information associated with adjusted region includes: a width of the adjusted region, a height of the adjusted region, and a color component of the image. In some embodiments, the second array includes: the order of the image within the time-dependent series of images that include the first set of images or the second set of images, the camera that obtained the image, and the set of features for the one object. In some embodiments, the third set of features of the object is obtained by combining the second array of the one object for each image from the first set of images and the second set of images. In some embodiments, the combining the second array of the one object for each image from the first set of images and the second set of images is performed based on the order of the image within the time-dependent series of images.

In some embodiments, the third set of features includes: the order of the image within the time-dependent series of images that include the first set of images or the second set of images, and the set of features for the one object. In some embodiments, the one or more features of the light signal of the object includes information that indicates whether the light signal is on or off. In some embodiments, each of the first set of images and the second set of images comprises a pre-determined number of images. In some embodiments, the determine the first set of features is performed in response to a first determination that the first set of images comprises the pre-determined number of images, and the determine the second set of features is performed in response to a second determination that the second set of images comprises the pre-determined number of images. In some embodiments, the first set of features or the second set of features includes a type of the first object or the second object, whether a light signal of the first object or of the second object is indicated, or a color of the light signal of the first object or of the second object. In some embodiments, each image in the first set of images and the second set of images is associated with a time stamp.

In some embodiments, the causing the vehicle to perform the driving related operation on a road in response to the determining the one or more characteristics of the object includes: sending instructions a brake system of the vehicle to cause the brake system to apply brakes in response to determining that the object has applied brakes and in response to determining that a distance between the object and the vehicle is less than a pre-determined distance. In some embodiments, the determining the one or more characteristics indicated by the light signal of the object from the fourth set of features of the object includes: determining that brakes are being applied by the object in response to determining, using the fourth set of features of the object, that the light signal of the object has been on for more than a pre-determined length of time. In some embodiments, the determining the one or more characteristics indicated by the light signal of the object from the fourth set of features of the object includes: determining that the object is intending to change lanes from a current lane to another lane on the road in response to determining, using the fourth set of features of the object, that the light signal on the object is periodically switching on and off.

In some embodiments, the determining the one or more characteristics indicated by the light signal of the object from the fourth set of features of the object includes: determining that the object is an emergency vehicle in response to determining, using the fourth set of features of the object, that a pattern of switching on and off for the light signal of the object is related to the emergency vehicle. In some embodiments, the determining the one or more characteristics indicated by the light signal of the object from the fourth set of features of the object includes: determining that the object is indicating an emergency signal upon determining, using the fourth set of features of the object, that a pattern of switching on and off of the light signal of the object indicates the emergency signal.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of driving operation, comprising:
receiving, by a computer located in a vehicle, a first set of images obtained by a first camera over time and a second set of images obtained by a second camera over time, wherein the first camera and the second camera are located on or in the vehicle;
determining, for each image in the first set of images, a first set of features of a first object;
determining, for each image in the second set of images, a second set of features of a second object;
obtaining, in response to determining that the first object is same as the second object, a third set of features of an object as a function of time by combining the first set of features of the first object for the first set of images and the second set of features of the second object for the second set of images;
obtaining a fourth set of features of the object by including one or more features of a light signal of the object determined from the third set of features of the object;
determining one or more characteristics indicated by the light signal of the object from the fourth set of features of the object; and
causing the vehicle to perform a driving related operation on a road based on the one or more characteristics of the object,
wherein the determining the first set of features and the second set of features includes performing following operations for each image from the first set of images and the second set of images:
cropping a region comprising one object from an image, wherein the one object includes the first object or the second object;
obtaining an adjusted region comprising the one object by adjusting the region to have a pre-determined width and a pre-determined height;
obtaining, for the one object, a first array comprising values associated with a plurality of variables that includes:
an order of the image within a time-dependent series of images that include the first set of images or the second set of images,
a camera that obtained the image, and
information associated with the adjusted region;
obtaining a second array that includes a set of features for the one object by analyzing information associated with the adjusted region from the first array, wherein the set of features included of the one object includes the first set of features of the first object or the second set of features of the second object.

2. The method of claim 1, wherein the cropping the region includes adding a bounding box around the one object detected from the image and cropping the region comprising the bounding box around the one object.

3. The method of claim 1, wherein the information associated with the adjusted region includes:
a width of the adjusted region,
a height of the adjusted region, and
a color component of the image.

4. The method of claim 1, wherein the second array includes:
the order of the image within the time-dependent series of images that include the first set of images or the second set of images,
the camera that obtained the image, and
the set of features for the one object.

5. The method of claim 1, wherein the third set of features of the object is obtained by combining the second array of the one object for each image from the first set of images and the second set of images.

6. The method of claim 5, wherein the combining the second array of the one object for each image from the first set of images and the second set of images is performed based on the order of the image within the time-dependent series of images.

7. The method of claim 5, wherein the third set of features includes:
the order of the image within the time-dependent series of images that include the first set of images or the second set of images, and
the set of features for the one object.

8. An apparatus for vehicle operation, comprising:
a processor configured to implement a method, the processor configured to:
receive, by a computer located in a vehicle, a first set of images obtained by a first camera over time and a second set of images obtained by a second camera over time, wherein the first camera and the second camera are located on or in the vehicle;
determine, for each image in the first set of images, a first set of features of a first object;
determine, for each image in the second set of images, a second set of features of a second object;
obtain, in response to determining that the first object is same as the second object, a third set of features of an object as a function of time by combining the first set of features of the first object for the first set of images and the second set of features of the second object for the second set of images;
obtain a fourth set of features of the object by including one or more features of a light signal of the object determined from the third set of features of the object;
determine one or more characteristics indicated by the light signal of the object from the fourth set of features of the object; and
cause the vehicle to perform a driving related operation on a road based on the one or more characteristics of the object,
wherein the determining the first set of features and the second set of features includes performing following operations for each image from the first set of images and the second set of images:
cropping a region comprising one object from an image, wherein the one object includes the first object or the second object;
obtaining an adjusted region comprising the one object by adjusting the region to have a pre-determined width and a pre-determined height;
obtaining, for the one object, a first array comprising values associated with a plurality of variables that includes:
an order of the image within a time-dependent series of images that include the first set of images or the second set of images,
a camera that obtained the image, and
information associated with the adjusted region;
obtaining a second array that includes a set of features for the one object by analyzing information associated with the adjusted region from the first array, wherein the set of features included of the one object includes the first set of features of the first object or the second set of features of the second object.

9. The apparatus of claim 8, wherein the one or more features of the light signal of the object includes information that indicates whether the light signal is on or off.

10. The apparatus of claim 8, wherein each of the first set of images and the second set of images comprises a pre-determined number of images.

11. The apparatus of claim 10,
wherein the determine the first set of features is performed in response to a first determination that the first set of images comprises the pre-determined number of images, and
wherein the determine the second set of features is performed in response to a second determination that the second set of images comprises the pre-determined number of images.

12. The apparatus of claim 8, wherein the first set of features or the second set of features includes a type of the first object or the second object, whether the light signal of the first object or of the second object is indicated, or a color of the light signal of the first object or of the second object.

13. The apparatus of claim 8, wherein each image in the first set of images and the second set of images is associated with a time stamp.

14. A non-transitory computer readable program storage medium having code stored thereon, the code, when executed by a processor, causing the processor to implement a method, comprising:
receiving, by a computer located in a vehicle, a first set of images obtained by a first camera over time and a second set of images obtained by a second camera over time, wherein the first camera and the second camera are located on or in the vehicle;
determining, for each image in the first set of images, a first set of features of a first object;
determining, for each image in the second set of images, a second set of features of a second object;
obtaining, in response to determining that the first object is same as the second object, a third set of features of an object as a function of time by combining the first set of features of the first object for the first set of images and the second set of features of the second object for the second set of images;
obtaining a fourth set of features of the object by including one or more features of a light signal of the object determined from the third set of features of the object;
determining one or more characteristics indicated by the light signal of the object from the fourth set of features of the object; and
causing the vehicle to perform a driving related operation on a road based on the one or more characteristics of the object,
wherein the determining the first set of features and the second set of features includes performing following operations for each image from the first set of images and the second set of images:
cropping a region comprising one object from an image, wherein the one object includes the first object or the second object;
obtaining an adjusted region comprising the one object by adjusting the region to have a pre-determined width and a pre-determined height;
obtaining, for the one object, a first array comprising values associated with a plurality of variables that includes:
an order of the image within a time-dependent series of images that include the first set of images or the second set of images,
a camera that obtained the image, and
information associated with the adjusted region;
obtaining a second array that includes a set of features for the one object by analyzing information associated with the adjusted region from the first array, wherein the set of features included of the one object includes the first set of features of the first object or the second set of features of the second object.

15. The non-transitory computer readable program storage medium of claim 14, wherein the causing the vehicle to perform the driving related operation on the road in response to the determining the one or more characteristics of the object includes:
sending instructions to a brake system of the vehicle to cause the brake system to apply brakes in response to determining that the object has applied brakes and in response to determining that a distance between the object and the vehicle is less than a pre-determined distance.

16. The non-transitory computer readable program storage medium of claim 14, wherein the determining the one or more characteristics indicated by the light signal of the object from the fourth set of features of the object includes:
determining that brakes are being applied by the object in response to determining, using the fourth set of features of the object, that the light signal of the object has been on for more than a pre-determined length of time.

17. The non-transitory computer readable program storage medium of claim 14, wherein the determining the one or more characteristics indicated by the light signal of the object from the fourth set of features of the object includes:
determining that the object is intending to change lanes from a current lane to another lane on the road in response to determining, using the fourth set of features of the object, that the light signal on the object is periodically switching on and off.

18. The non-transitory computer readable program storage medium of claim 14, wherein the determining the one or more characteristics indicated by the light signal of the object from the fourth set of features of the object includes:
determining that the object is an emergency vehicle in response to determining, using the fourth set of features of the object, that a pattern of switching on and off for the light signal of the object is related to the emergency vehicle.

19. The non-transitory computer readable program storage medium of claim 14, wherein the determining the one or more characteristics indicated by the light signal of the object from the fourth set of features of the object includes:
determining that the object is indicating an emergency signal upon determining, using the fourth set of features of the object, that a pattern of switching on and off of the light signal of the object indicates the emergency signal.

* * * * *